July 21, 1953 H. P. HENDERSON 2,646,398
ELECTROPROCESSING APPARATUS
Filed Oct. 8, 1948 2 Sheets-Sheet 1
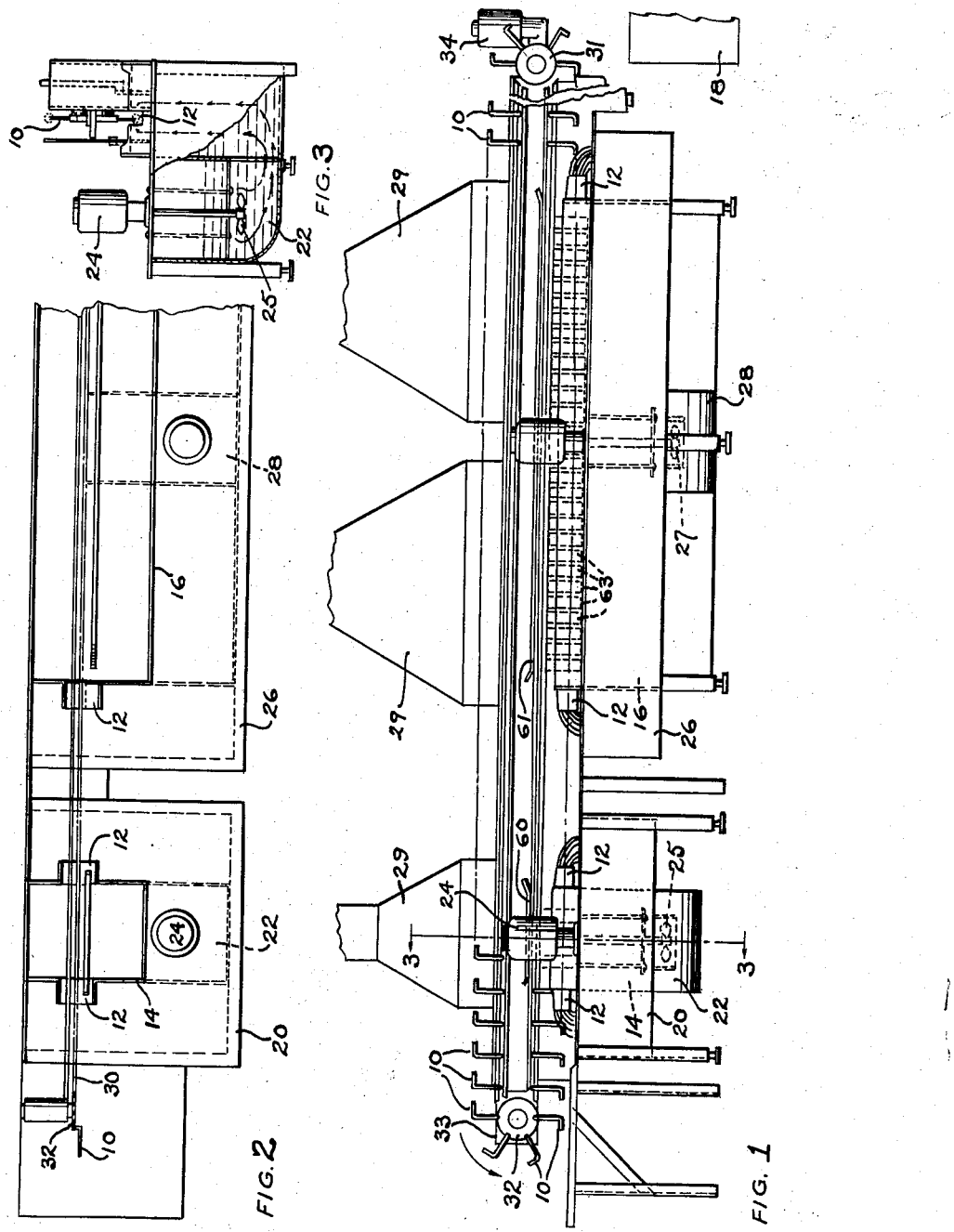
INVENTOR;
HARRY P. HENDERSON.
BY Romeyn A. Spure
HIS ATTORNEY.

July 21, 1953     H. P. HENDERSON     2,646,398
ELECTROPROCESSING APPARATUS

Filed Oct. 8, 1948     2 Sheets-Sheet 2

INVENTOR;
HARRY P. HENDERSON.
BY Romeyn A. Spare
HIS ATTORNEY.

Patented July 21, 1953

2,646,398

UNITED STATES PATENT OFFICE 2,646,398

ELECTROPROCESSING APPARATUS

Harry P. Henderson, North Woodbury, Conn., assignor to General Motors Corporation, Detroit, Mich., a corporation of Delaware Application October 8, 1948, Serial No. 53,466

7 Claims. (Cl. 204—203)

This invention relates to a chemical apparatus and method and particularly to an improved method and apparatus for cleaning and/or electroprocessing work pieces.

Heretofore, in production line electroplating, a belt or chain-supported series of spaced work holders has been employed for transporting work pieces successively through tanks containing cleaning, plating and washing solutions. However, these production lines have required complicated mechanisms to guide the work pieces successively up over the end one tank, down into and through the solution within this tank, up over the other end of this tank and so on into, through and out of succeeding tanks in the production line. Also, this angular feeding of the work pieces successively over the ends of and into and out of these tanks prevents close spacing of the adjacent tanks and results in much wasted tank length and in wasted tank volume since the work pieces may remain in solution only through a portion of the length of each tank.

It is therefore an object of this invention to provide an improved treatment apparatus and method for transporting a work piece in a substantially horizontal plane into and completely through the solution in a treatment tank.

Another object is to provide an improved treatment apparatus and method for transporting a work piece in a substantially straight line successively through the solutions in a plurality of treatment tanks.

Another object is to provide an improved treatment apparatus and method for transporting spaced work pieces in a straight line into and completely through the solutions in adjacent treatment tanks.

A further object is to provide an improved apparatus and method for connecting a work piece in a circuit only while this work piece is within an electroprocessing solution.

To these ends and also to improve generally upon devices of this character, the invention consists in the various matters hereinafter described and claimed. In its broader aspects, the invention is not necessarily limited to the specific construction illustrated in the accompanying drawings in which Figure 1 is a fragmentary side elevation of my invention;

Figure 2 is a fragmentary plan view;

Figure 3 is a sectional view partly broken away and taken along the line 3—3 of Figure 1;

Figure 4:
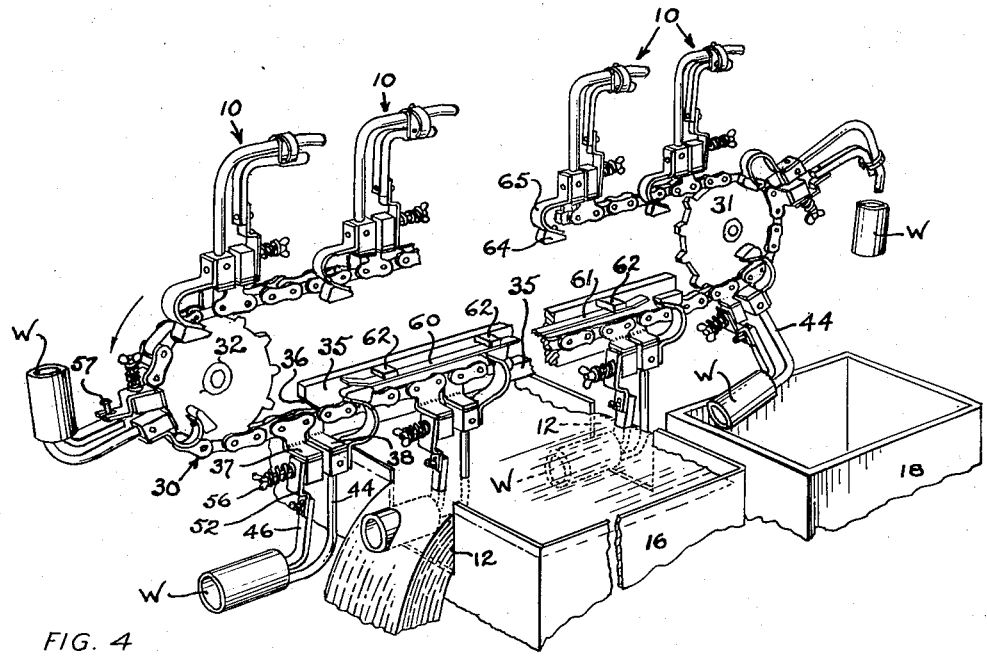
Figure 4 is a fragmentary perspective view showing the feeding of work pieces into and through a treatment tank.

Generally considered, a conveyor having a plurality of spaced work holders 10, is arranged to transport successive work pieces W in a substantially straight horizontal line into, through and out of the solution in a treatment tank. Each end of the tank is provided with a wier, as 12, through which the work pieces W are respectively fed into and out of the tank solution. A pump, communicating with a supply tank which receives the solution flowing out of the wiers, maintains the level of the solution in the treatment tank at such a height that the work pieces remain completely submerged as they are carried through the tank. Each work holder after leaving the treatment tank is arranged to automatically release its work piece.

In the illustrated embodiment, my apparatus and method is arranged to electroprocess work pieces by passing them through a cleaning bath in a tank 14 follower by passing them through a plating solution in a tank 16 after which they are dropped from their holders 10 into a suitable bin 18. The cleaning tank 14 is mounted in and projects above a supply tank 20 which extends sufficiently beyond the ends of the tank 14 to receive the solution flowing from its weirs 12. Legs support the tank 20 and a duct 22 provides for flow of solution between the bottoms of both tanks. A motor 24, mounted above the tank 20, drives an impeller 25 at a suitable speed in the duct 22 producing circulation from the supply tank 20 up into the cleaning tank 14 causing the level of solution in the cleaning tank to rise and remain above the work pieces W while they are transported through the tank solution. The flow of this cleaning solution past the work pieces entering and leaving the wiers provides for return circulation of the solution into the supply tank 20 and controls the level of solution in the tank 14 while the motor 24 is operating. The plating tank 16, which has wiers 12 similar to and aligned with the cleaning tank wiers 12, is mounted in and projects above a supply tank 26 that extends beyond the ends of the plating tank and receives the plating solution flowing from the plating tank wiers 12. Legs support the supply tank 26, and a motor driven impeller 27 circulates the plating tank solution from the supply tank through a communicating duct 28 into the bottom of the plating tank 16 in the same manner as described with respect to the cleaning tank 14 to maintain circulation and cooling of the plating tank solution and to keep the level of the plating tank solution above the work pieces W being fed through it. The ends of the supply tanks 20 and 26 preferably extend only sufficiently beyond the ends of the tanks which they support to receive the solutions flowing from the wiers, and the adjacent supply tanks ends are closely spaced so that the work pieces W travel only a short distance while out of solution between adjacent tanks. Suitable hoods 29 are located above the tanks and above the work holders to conduct objectionable fumes away from the apparatus.

A conveyor chain 30, provided with generally horizontal upper and lower runs extending longitudinally of and above the tanks, is carried by a driving sprocket 31 and an idling sprocket 32, these sprockets being respectively mounted for rotation at the ends of a longitudinal frame 33 supported above the tanks. The work holders 10 are carried in spaced relation by the chain, and a motor 34 operates through a speed reduction unit to drive the sprocket 31 causing a slow advance of the chain and work holders 10 for carrying the work pieces W at a desired speed into and through the treatment tanks 14 and 16. These work pieces, herein shown as tubular, are internally gripped by the work holders 10 while they are located in the lower chain run which is supported in a substantially straight horizontal line above the tanks by sliding this lower chain run between a pair of horizontally disposed upper and lower guide rails 35 secured to the frame 33. The ends of these guide rails are angularly cut away at 36 to facilitate entrance and egress of the chain.

Figure 5:
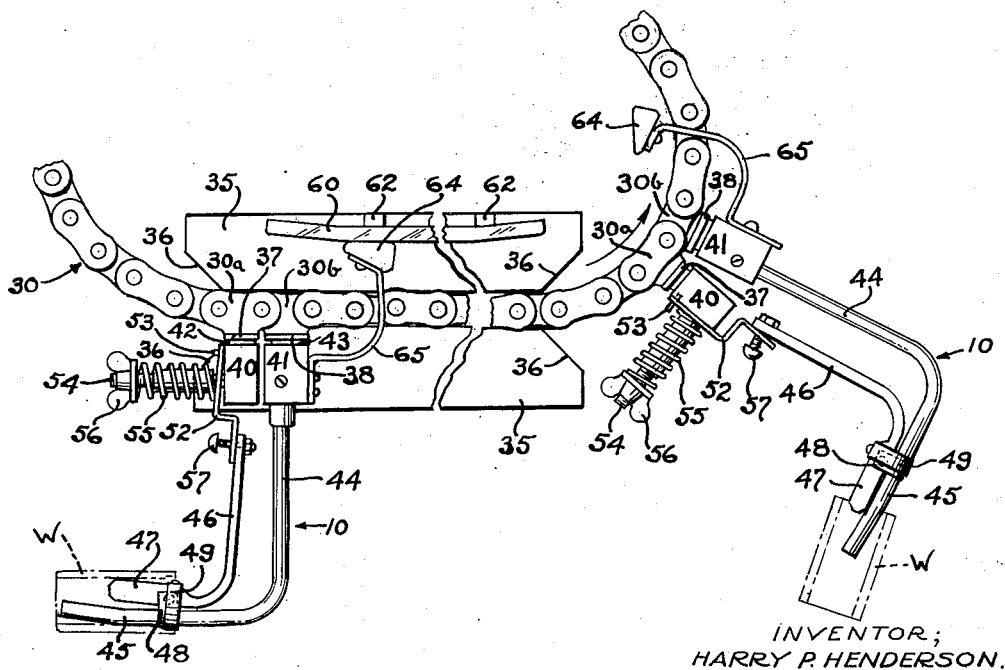
Figure 5 is a fragmentary view showing the operation of a work holder.

Each work holder 10, as best illustrated in Figure 5, is secured to and operated by a side link 30a and by an adjacent connecting link 30b of the chain 30. These links are respectively provided with laterally projecting body portions 37 and 38 to which are secured outwardly projecting blocks 40 and 41 at the side of the chain. Insulating members 42 and 43 electrically insulate these blocks and the work holders 10 from the chain. A supporting bar 44, having its upper end demountably secured in the block 41, as by a set screw, has a laterally projecting lower end 45 terminating in a bent tip. An L-shaped clamping arm 46, provided with an upper portion spaced from and generally parallel to the upper end of the bar 44, has an enlarged laterally extending lower end 47 that is pivoted intermediate its length between a pair of arms 48 secured to and projecting from an intermediate portion of the lower end 45 of the bar 44. An annular member 49, secured to one of the members 45 or 47 and extending in spaced relation about the other member, serves as a guide for locating the position of a work piece W in a work holder. The flat upper portion of a stepped plate 52 is apertured to loosely fit over a pin 53 laterally projecting from the upper end of the block 40 and is also apertured to loosely fit over a stud 54 laterally projecting from an intermediate portion of this block. A coiled spring 55 on the stud 54 is adjustably compressed against the plate 52 by a thumb nut 56 threaded on this stud to regulate the yieldable work-gripping pressure of the work holder members 45 and 47. The stepped lower end of the plate 52 laterally engages the upper end of the clamping arm 46 and has an open-ended slot that loosely and demountably receives the projecting end of a bolt 57 fastened through the clamping arms 46. The clamping arm and supporting bar assembly, which may become corroded and worn from many passes through the treatment solutions is easily replaced since this assembly is held in position by the set screw in the block 41.

As each work holder 10 passes around the sprocket 32, a tubular work piece W is dropped over the work holder members 45, 47 and against the locating member 49. As the work holders are carried into the lower straight chain run, the members 45, 47 relatively move apart into yieldable work gripping position, and as the work holders move upwardly around the sprocket 31 after passing beyond the last tank 26, the members 45, 47 again move towards each other and drop the work piece W into the bin 18. Whenever a pair of adjacent work holder-supporting chain links engage one of the sprockets 30 or 31, the resultant angled relation of these links divergently positions the adjacent blocks 40, 41 causing the L-shaped clamping arm 46 to be pivotally positioned away from the supporting bar 44 resulting in a relative movement of the members 45, 47 into the work releasing position as best shown by the position of the right-hand work holder 10 of Figure 5. As these work holder-supporting chain links pass into the lower chain run, the blocks 40, 41 are swung into substantially parallel relation causing a relative approach of the clamping arm 46 and supporting bar 44 with a consequent work-gripping engagement of the members 45 and 47 as best illustrated by the position of the left-hand work holder in Figure 5. At this time, the plate 52 swings from its upper end angularly outwardly from the block 40 and the adjustably compressed spring 56 determines the yieldable work-gripping pressure of the members 45 and 47.

A pair of horizontally aligned electrically conductive bus bars 60 and 61, having upwardly turned ends, are supported through suitable insulators 62 fastened to the upper guide rail 35. Electrical connections between one of these bus bars and a work holder therebeneath is made through a contactor 64 yieldably held in slidable engagement against the underside of the bus bar by a curved metal spring 65 whose lower end is fastened to the block 41. Conventional direct current circuits (not shown) as commonly used for electroprocessing of work pieces in solution are connected between electrodes, as 66, depending in the treatment tank solutions, and the bus bars 60, 61. Each bus bar only extends for the length of the treatment tank so that the work holders and their supported work pieces W will be maintained in circuit only while passing through a treatment tank. If the first treatment tank 14 is used for cleaning by electroprocessing, the current flow in the circuit is directed from the bus bar 60 through the work pieces W in this tank solution and thence through the solution to the electrodes depending in this tank. However, if the cleaning is to be performed solely by chemical treatment, no electrical circuit is needed and the bus bar 60 and electrodes within the tank 14 may be eliminated. In the plating tank 16, the electrodes 63 serve as anodes and current in the circuit flows therefrom through the plating solution to the work pieces W in this solution and thence back through the work holders 10 and the bus bars 61.

I claim:

1. In an electroprocessing apparatus, a tank for a treatment solution, a pair of weirs respectively located at the opposite ends of the tank for receiving the flow of solution from the tank, pump mechanism for receiving the solution flowing from the weirs and forcing the solution back up into the bottom of said tank to maintain the solution in the tank at a predetermined level, a work holder for removably supporting a work piece, and work holder transporting means for feeding the work piece in a substantially straight horizontally disposed path through one weir into submersion within the tank solution and out of said solution through the other weir.

2. In an electroprocessing apparatus, a supply tank for a treatment solution, a treatment tank within the supply tank and extending above the supply tank for receiving a treatment solution, a pair of weirs respectively located at the opposite ends of the treatment tank and located above the supply tank for delivering solution from the treatment tank into the supply tank, mechanism in the supply tank for pumping the treatment solution up through the bottom of the treatment tank and controlling the level of the solution flowing into the weirs, and work transporting means for feeding a work piece in a horizontal path through one weir into submersion within the treatment tank and out of the treatment solution through the other weir.

3. In an electroprocessing apparatus, a cleaning tank, a plating tank, said tanks being arranged to contain treatment solutions, the ends of said tanks being respectively provided with aligned weirs through which the solutions may flow from the tanks, pump mechanism for receiving the solutions flowing from said weirs and for feeding the solutions up into the bottoms of said tanks for maintaining the solutions flowing into the weirs at predetermined levels, a work holder for supporting a work piece, and means to feed the work holder in a substantially straight horizontal path for transporting the work piece through a weir into submersion within the first tank and out of this tank through another weir thence through another weir into the second tank solution and out of solution through the last weir.

4. In an electroprocessing apparatus, a treatment tank arranged to be partially filled with a treatment solution, a plurality of weirs in the tank for receiving the flow of treatment solution from the tank, a supply tank for receiving treatment solution flowing from the weirs, mechanism for forcing said solutions from the supply tank upwardly through the bottom of the treatment tank to maintain a predetermined level of the solution flowing into the weirs, and means to horizontally feed a work piece through one of the weirs into submission within the treatment solution and out of said solution through another weir.

5. In an electroprocessing apparatus, a tank for containing a treatment solution, a weir for receiving the flow of the solution from the tank, a pair of sprockets, a chain supported by the sprockets and having a substantially straight run above and beyond the tank, chain driving mechanism, a work holder carried by and projecting from adjacent links of said chain and arranged to carry a work piece horizontally through the weir and into the tank solution, pivotally connected work gripping members on the work holder, and means responsive to the angular relation of said adjacent chain links for positioning the work gripping members in a work gripping position while these chain links are substantially aligned in the straight chain run and for positioning the work gripping members in a work releasing position when said adjacent chain links are angularly positioned by their sprocket engagement.

6. In an electroprocessing apparatus, a tank for a treatment solution, a pair of weirs for directing the flow of the solution from the tank, a pair of sprockets beyond the ends of the tank, a chain carried by the sprockets and having a straight horizontal run above the tank and between said sprockets, chain driving mechanism, a work holder projecting from adjacent links of said chain and arranged to horizontally carry a work piece through one weir and through the tank solution and out through the other weir, the work holder having lateral projections extending from adjacent links of the chain, a pair of L-shaped work gripping members demountably secured to said lateral projections, means pivotally mounting one work gripping member on the other work gripping member, and mechanism controlling the angular relation of said adjacent chain links for yieldably positioning the work gripping members in work gripping position while the chain links are aligned in the straight chain run and for positioning the work gripping members in a work releasing position while said adjacent chain links are located in angular relation to each other by their sprocket engagement.

7. In an electroprocessing apparatus, a tank for containing a treatment solution, a weir in the tank, a chain supported by sprockets and having a horizontally guided straight run above and extending beyond the ends of the tank, chain driving mechanism, a work holder carried by and projecting from adjacent links of said chain and arranged to carry a work piece through the weir and into the tank solution, the work holder having a pair of L-shaped members provided with pivotally connected lateral work-engaging portions, one of the L-shaped members being carried by and projecting from one of said adjacent chain links, a yieldable connection between said other chain link and said other L-shaped member, and the angular position of said adjacent links operating through said yieldable connection and the L-shaped members to position the work-engaging portions in a yieldable work-gripping position when these links are aligned in the straight chain run and to position these work-engaging portions in a work-releasing position whenever the chain links are angularly related by their sprocket engagement.

HARRY P. HENDERSON.

References Cited in the file of this patent

UNITED STATES PATENTS

| Number | Name | Date |
| --- | --- | --- |
| 1,220,260 | Morrison et al. | Mar. 27, 1917 |
| 1,298,155 | Anthony | Mar. 25, 1919 |
| 1,574,823 | Kronquest | Mar. 2, 1926 |
| 1,768,358 | Harrison | June 24, 1930 |
| 1,959,764 | Potthoff | May 22, 1934 |
| 2,085,730 | Cox | July 6, 1937 |
| 2,387,160 | Loney | Oct. 16, 1945 |
| 2,428,141 | Burkhardt | Sept. 30, 1947 |

FOREIGN PATENTS

| Number | Country | Date |
| --- | --- | --- |
| 629,668 | Germany | May 8, 1936 |